(12) United States Patent
Wike et al.

(10) Patent No.: US 9,129,288 B2
(45) Date of Patent: Sep. 8, 2015

(54) SYSTEM AND METHOD FOR OPERATING MULTIPLE CHECKOUT STATIONS WITH A SINGLE PROCESSOR

(75) Inventors: Charles Wike, Sugar Hill, GA (US); Gibson Prevot, Lilburn, GA (US)

(73) Assignee: NCR Corporation, Duluth, GA (US)

( * ) Notice: Subject to any disclaimer, the term of this patent is extended or adjusted under 35 U.S.C. 154(b) by 3267 days.

(21) Appl. No.: 10/322,870

(22) Filed: Dec. 18, 2002

(65) Prior Publication Data

US 2005/0187826 A1 Aug. 25, 2005

(51) Int. Cl.
  G06Q 30/02 (2012.01)
  G06Q 20/20 (2012.01)
  G07F 5/18 (2006.01)
  G07F 11/00 (2006.01)
  G07G 1/14 (2006.01)

(52) U.S. Cl.
  CPC ............. *G06Q 30/02* (2013.01); *G06Q 20/202* (2013.01); *G07F 5/18* (2013.01); *G07F 11/002* (2013.01); *G07G 1/14* (2013.01)

(58) Field of Classification Search
  CPC ... G06Q 20/202; G06Q 20/20; G06Q 20/322; G06Q 20/40; G06Q 20/32
  USPC .......................................................... 705/21
  See application file for complete search history.

(56) References Cited

U.S. PATENT DOCUMENTS

| | | | |
|---|---|---|---|
| 4,873,631 A | 10/1989 | Nathan et al. | |
| 5,892,900 A * | 4/1999 | Ginter et al. | 726/26 |
| 6,044,405 A * | 3/2000 | Driscoll et al. | 709/232 |
| 2001/0016871 A1 | 8/2001 | Fujita | |
| 2002/0046185 A1 | 4/2002 | Villart et al. | |
| 2002/0091571 A1* | 7/2002 | Thomas et al. | 705/14 |
| 2003/0019933 A1* | 1/2003 | Tsikos et al. | 235/454 |
| 2003/0132297 A1* | 7/2003 | McCall et al. | 235/472.01 |
| 2003/0196138 A1 | 10/2003 | Ito | |
| 2004/0181454 A1 | 9/2004 | Manno | |
| 2004/0267618 A1 | 12/2004 | Judicibus et al. | |
| 2005/0021409 A1 | 1/2005 | Michaud, Jr. et al. | |

OTHER PUBLICATIONS

Bernal, Carrillo and Ivan, Marcelo. Methodologies for designing synchronous CSCW environments. Syracuse University, ProQuest, UMI Dissertations Publishing, 2002.*
JavaPOS White Paper, JavaPOS Introduction, Dec. 17, 1998, Internet—http://www.javapos.com/downloads/jpos.whitepaper.pdf.

* cited by examiner

*Primary Examiner* — Ryan Zeender
*Assistant Examiner* — Fawaad Haider
(74) *Attorney, Agent, or Firm* — Harden E. Stevens, III

(57) ABSTRACT

A system and method enables a central processor to control the operations of a plurality of checkout stations. Each checkout station includes a high speed data hub to provide data from a checkout station to the central processor. The central processor processes the data and generates data and/or commands. The data may be stored in a data repository located proximately with the central processor or at the checkout station that communicated the data to the central processor. Data messages generated by the central processor are communicated to the checkout stations at a high speed data rate of at least 12 Mbps. By using a central processor for controlling the operation of more than one checkout station, processors and processor support requirements are reduced for checkout stations.

16 Claims, 4 Drawing Sheets

SYSTEM AND METHOD FOR OPERATING MULTIPLE CHECKOUT STATIONS WITH A SINGLE PROCESSOR

FIELD OF THE INVENTION

This invention relates to checkout stations used in retail establishments and, more particularly, with checkout stations having a plurality of peripherals coupled to the terminals.

BACKGROUND OF THE INVENTION

Self-checkout stations at grocery stores and other retail stores are well known. The stations permit a consumer to scan articles for purchase so the station may identify the articles and a corresponding price. When the consumer indicates all articles for purchase have been presented to the terminal, a sub-total is accumulated, any taxes and discounts are computed, and a total amount due is displayed for the consumer. The station then allows the consumer to select a payment method. The station presents menu selections to the consumer so funds may be transferred to the retailer's account. Upon confirmation of payment, the articles are released to the consumer.

A self-checkout station typically includes a terminal, a scanner/scale for reading unit price codes (UPC) and determining article weight, a cashier keypad and display, a POS terminal for payment entry, a receipt printer, a change unit, and a checkout area for holding articles once they have been scanned. The terminal also includes a display, a processor, memory, programmed instructions, and data peripherals to control the operations of the station. The programmed instructions may contain modules for querying for article prices, computing totals and performing other functions related to the purchase of articles through a self-checkout station. Some checkout stations may also include a security application program that uses data from sensors such as scales to reduce the likelihood that the consumer leaves without scanning all of the articles or exchanging scanned articles with more expensive articles that have not been scanned.

Typically, two or more self-checkout stations are located proximately to one another with a checkout attendant station nearby. The checkout attendant may help consumers who may be using a self-checkout station for the first time, who are having trouble with scanning an article, or who are having difficulty with a payment method or the like. That is, the primary duty of the attendant is to provide assistance to customers who are using the self-checkout stations so the stations efficiently and quickly process customers with their checkouts. Although these attendants are available to assist in security monitoring, such duties actually detract from the performance of their primary duty.

Checkout stations that require cashiers or other store personnel to operate them have an architecture that is similar to that of the self-checkout stations. That is, they have a terminal that is coupled to a variety of peripherals, such as a hard disk drive, a display, a credit card terminal, and the like. However, these terminals have their primary display and keyboard oriented away from the consumer so a store employee may control the checkout procedure. Many fast food establishments have the same type of terminals, although the keyboards may be supplied with keys that may be pre-programmed or programmed on site for association with specific food items on an establishment's menu. Fast food terminals may also include peripherals, such as a hard disk drive, and ancillary displays. One example of ancillary displays is a display in the kitchen or other food preparing area where the display may be used to inform the staff of the ordered items that need preparation for service to consumers.

In each of the environments described above, each terminal includes a processor and the necessary hardware used to support its operation. For example, each processor typically resides on a printed circuit card that includes circuitry for controlling the communication bus of the terminal. Program and data memory is also required for the operating system and working memory space so each processor may perform in accordance with instructions for a checkout application. Not only are the hardware costs for each processor duplicated in each checkout station, self-checkout station, or attendant station, but the software costs are also replicated as well. That is, software licenses are required for copies of the operating system software and other application programs that reside within the memory of each terminal. These duplicative expenses increase the cost of these terminal systems for an industry that historically has low profit margins.

The cost of these duplicative elements is further exacerbated by the maintenance and service costs associated with these independent processor-controlled systems. Each processor and its requisite interface and support components are subject to wear and tear that may degrade the operational performance of a terminal and require replacement. Because the terminals are not likely to fail at approximately the same time, multiple service calls may be required to service the terminals and to replace failing components associated with the processors in the terminals. Likewise, software upgrades for the applications executed by the terminal processors require the memory of each processor to be serviced for installing the upgrade in the memory of a processor. This increases the amount of time required for a service call to upgrade the performance of a terminal.

Service calls to sites having multiple checkout stations also require that the maintenance person open the housing of each terminal to clean, inspect, or replace components. This duplicative activity of opening and closing each terminal during service or maintenance visits also increases the time and expense of service and maintenance calls.

What is needed is a way to reduce the duplication of processors and their support components in self-checkout and retail terminals.

What is needed is a way to reduce the need to house a terminal processor and its associated computer peripherals in a housing separate from another terminal processor and its associated computer peripherals.

What is needed is a way to reduce the need for multiple software licenses because a copy of an application program is required for each terminal.

What is needed is a way to reduce the time and expense for maintenance and service calls for checkout stations.

SUMMARY OF THE INVENTION

The above limitations of previously known terminal systems and methods are overcome by a system and method conforming to the principles of the present invention. The system includes a plurality of checkout stations, each checkout station in the plurality of checkout stations having a high speed data hub and a central processor coupled to each high speed data hub for high speed data communication between the central processor and each checkout station in the plurality of checkout stations. The high speed data communication enables the central processor to control the operation of each terminal in the plurality of checkout stations. The central processor is located remotely from at least one of terminals being controlled by the central processor. The central processor may be coupled to more than one data storage device so data from the terminals may be stored on separate data devices even though operations of the multiple terminals are being controlled by a single central processor. Alternatively, the central processor may be coupled to a single data device for storing the data from different terminals in separate files or other data structures.

In a preferred embodiment of the present invention, a USB 2.0 communication hub couples the central processor to the components of a checkout or self-checkout station. The components include the display, credit card terminal, coin dispenser, and other typical components of a self-checkout or checkout station. The high speed data hub enables the components to communicate with the central processor at a rate sufficient to provide data to the processor so it may control the operations of the components in substantially real time. The hard disk storage for data generated by the processor or the terminal components may be located at the terminal, in proximity to the central processor, or at another location. Thus, existing self-checkout stations and checkout stations may be retrofitted to replace a processor and its support components with a high speed data communication interface, such as a USB 2.0 hub or a 1394 Firewire interface.

The central processor is preferably a component in a server that is coupled to the high speed communication hub or interface at a terminal through a network hub, such as a local access network (LAN) or wireless network Ethernet hub. In this embodiment, the server includes a terminal control application that services the components of each terminal to control their operation so a checkout procedure may be performed at a terminal. Alternatively, an image of a terminal application for each terminal may execute at the server. Data received at the server may be provided to a database controller or object repository so the data for all terminals serviced by the server may be stored in a single database. In another alternative embodiment, a storage device for each terminal may be provided for the storage of data generated by a terminal. In yet another alternative embodiment, a storage device may be located at each terminal for the storage of data generated by the operation of the terminal.

In another embodiment of the present invention, the central processor may be housed within one of the terminals in a plurality of terminals. The central processor may be coupled through a network hub to a high speed data hub or interface at each terminal. A single data storage device for all of the terminals may be housed at the terminal where the central processor is located, at another one of the terminals coupled to the central processor, or at a central data storage location remote from the location of the terminals. Alternatively, a data storage device may be kept at each terminal for the storage of data generated by the operation of the terminal or a data storage device for each terminal may be kept at a location remote from the terminals.

A method that incorporates the principles of the present invention includes generating data at a plurality of checkout stations, communicating the generated data from each checkout station in the plurality of checkout stations to a central processor at a high speed data rate, and processing the data at the central processor so the central processor controls the operation of each checkout station communicating generated data with it. The data processing may include storing data in a repository that corresponds to the checkout station that communicated the data processed by the central processor. The method may also include retrieving data for the checkout station that communicated the data processed by the central processor. The method may also include generating commands for the checkout station that communicated the data processed by the central processor. Data messages may be generated from the data processing performed by the central processor and communicated to the plurality of checkout stations at a high speed data rate.

The system and method of the present invention enables a single processor to control the operations of more than one terminal so duplicative processors and processor support components may be reduced.

The system and method of the present invention enables the processor controlling multiple checkout stations to be located in a single housing.

The system and method of the present invention only require a single software license for the programs that execute on the central processor for operation of the terminals coupled to the central processor.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

DETAILED DESCRIPTION OF THE INVENTION

Figure 1:
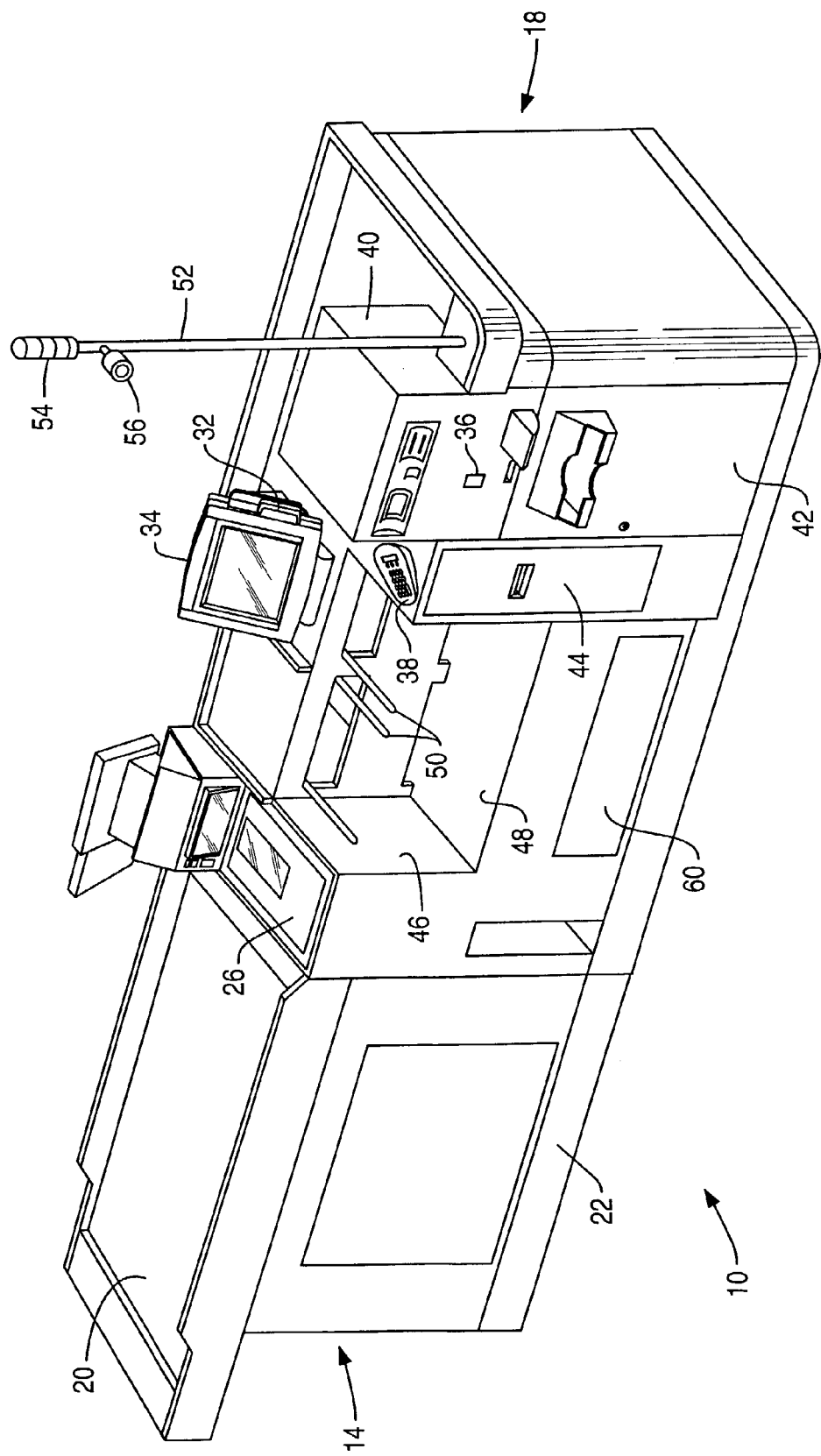
FIG. 1 depicts the typical layout of a self-checkout station in which the system and method of the present invention may be implemented.

A checkout station that may be modified in accordance with the principles of the present invention is shown in FIG. 1. Checkout station 10 may include a feeder unit 14 and a checkstand 18. Feeder unit 14 includes a feeder belt 20 and housing 22 for the motor and control circuitry that operates feeder belt 20. Feeder unit 14 is movably coupled to checkstand 18 so the feeder belt may be aligned with scanner/scale unit 26. Checkstand 18 includes scanner/scale unit 26, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of articles that are sold on a price/unit of weight basis. Consumer terminal 34 displays article data as it is entered through scanner/scale unit 26. Payment terminal 38 may be any known POS terminal that incorporates a card reader 32 to support credit card, debit card, and other payment methods. Receipt printer 44 provides a consumer with a receipt itemizing the articles purchased and the method of payment.

Receipt printer 44 and scanner/scale unit 26 may be separated by a bag well 46 having a security scale 48 for its floor. Bags for storing articles that consumers have scanned and weighed are hung from hanging rails 50 in bag well 46. Security scale 48 uses article weight data derived from scanner/scale 26 or a database using a scanned unit product code (UPC) to verify that only the articles scanned are placed on the security scale. Security application programs operating within terminal 34 monitor security scale 48 to determine whether articles not scanned have been added to the security scale area. An anomalous condition that requires investigation may be signaled by lighting a warning or alert light color within the tri-color indicator mounted at the terminal end of indicator pole 52 of checkstand 18. A security camera 56 may be mounted onto indicator pole 52 for providing a video signal to a security officer surveillance area or to some storage media. A database, disk drive, or other computer peripheral required for station operation may be housed within peripheral tray 60 located within checkstand 18. Checkstand 18 also includes upper currency module 40 for receiving currency and coins from a consumer as payment for a transaction. Module 40 also includes a coin dispenser 36 that returns the coin portion of the consumer's change while lower currency module 42 returns the bill portion of the consumer's change. Module 40 may also include a cash recycling unit (not shown) to provide cash received from consumers in the change dispensed to consumers.

As shown in FIG. 1, a consumer may place articles on feeder belt 20 and belt 20 is driven to bring articles to the end of belt 20 where a shut-off mechanism stops belt 20. The consumer may then remove articles from belt 20 and move them, one at a time, over scanner/scale 26 for article product data retrieval and/or weighing. Alternatively, the consumer may pull a cart containing articles for purchase so it is adjacent feeder unit 22 and place articles from the cart onto scanner/scale 26. The scanned articles may then be placed in bags on security scale 48. Once all of the articles are scanned, a consumer may provide payment through payment terminal 38 or currency module 40, receive change from module 44, and a receipt from printer 44. The consumer may then remove the bags from security scale 48 and leave station 10. The operation of checkout station 10 is controlled by a processor that is typically incorporated within terminal 34. The present invention migrates the data processing and control function of the processor in each station that controls its operation to a central processor.

Figure 2:
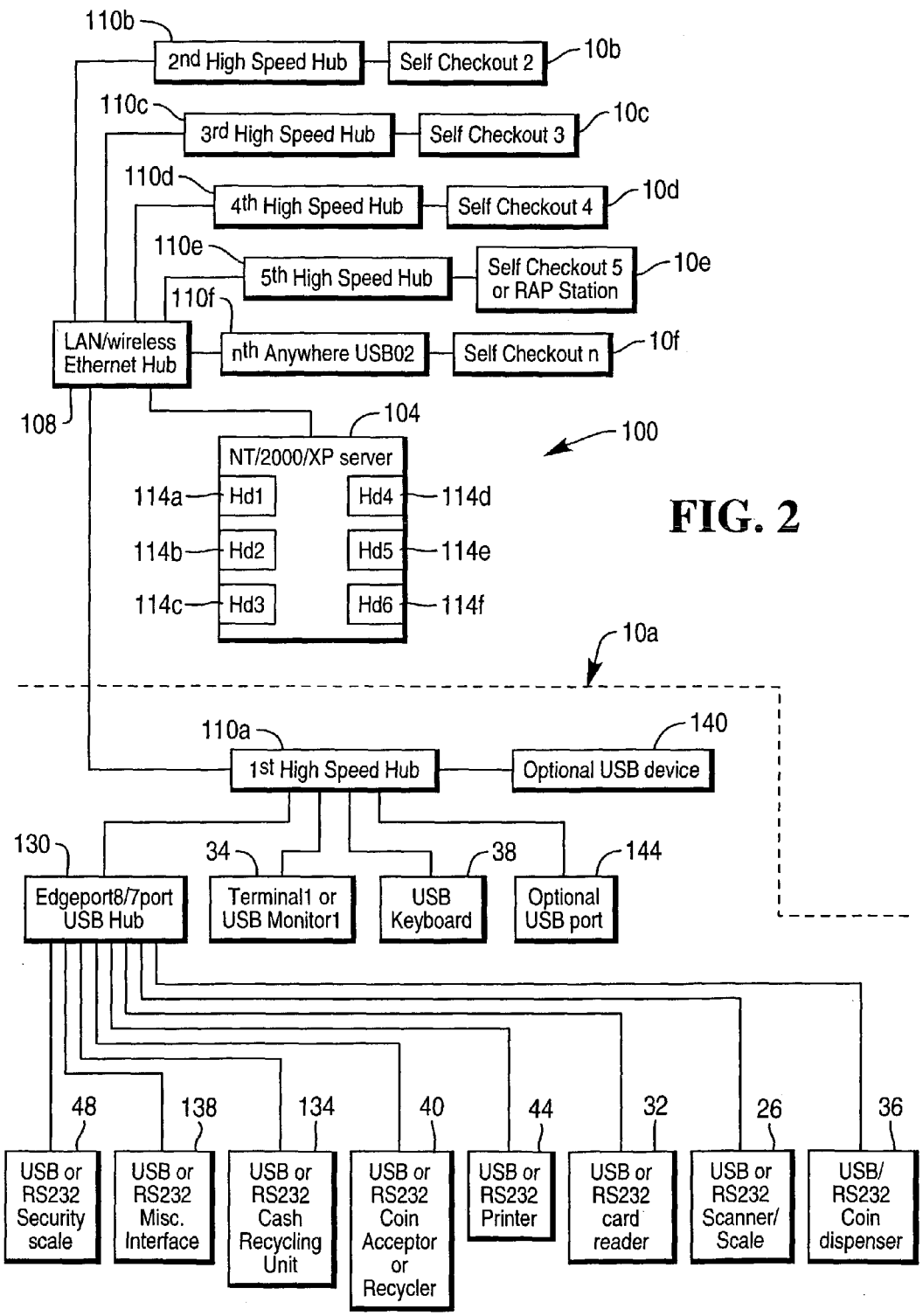
FIG. 2 is a block diagram of a system incorporating the principles of the present invention in a plurality of self-checkout stations.

A block diagram of a system incorporating the principles of the present invention is shown in FIG. 2. System 100 includes a self-checkout station 10a and its components, such as the one shown in FIG. 1, so like numerals are used for like components in FIG. 2. System 100 includes a server 104 that is coupled to self-checkout stations 10a, 10b, 10c, 10d, and 10f through a network hub 108. Each self-checkout station 10a-10f includes a high speed data communication hub 110a-110f that communicates data between its associated self-checkout station and network hub 108. One of the self-checkout stations may be a remote attendant station that may be used to monitor operations at any one of the self-checkout stations and to alert a store attendant to situations where a consumer may be having difficulty with a checkout procedure or attempting to thwart security measures.

Server 104 may be any computer with sufficient resources to act as a server to client applications executing in the components of a self-checkout station that may communicate with server 104 through the high speed data hub coupled to the self-checkout station. Server 104 preferably has at least a Pentium processor operating at 1.8 GHz with 128 MB of RAM and a 60 GB hard drive. The hard drive may be partitioned to allocate storage space for each of the self-checkout stations coupled to the server, although other data structures, such as folders and files, for example, may be used to store data corresponding to each checkout station. Alternatively, server 104 may be coupled to a database management system (not shown) for storing operational data received from the self-checkout stations and for querying the database that stores the product identification and pricing data for items sold in the store. Preferably, server 104 includes hard drives 114a-114f. Each hard drive corresponds to one of the self-checkout stations coupled to the server as shown in FIG. 2. Hard drives 114a-114f are used to store data for the checkout station that corresponds to the drive. In this preferred architecture, server 104 is coupled to a database management system (not shown) for database operations with the product identification and pricing database.

The processor of server 104 acts as a central processor for the self-checkout stations to process data for the stations and to control their operations in accordance with a terminal control application executing on server 104. Server 104 may have a single self-checkout station control application that controls all of the self-checkout stations or it may execute an image of a self-checkout station control application for each of the self-checkout stations coupled to sever 104. Data generated by a self-checkout station is identified in accordance with the network protocol implemented in system 100. Preferably, the network protocol is the USB protocol implemented on an Ethernet 10BaseT backbone, although other protocols may be used to identify the source and recipient of data communicated over the network formed by server 104, network hub 108, and the self-checkout stations coupled to server 108. Data received from a self-checkout station is processed by the control application or control application image to generate self-checkout station component commands and/or to store data in a data repository corresponding to the self-checkout station. Any self-checkout station component commands or data generated by the control application or control application image are communicated to the self-checkout station through network hub 108, which routes the message containing the component commands or data to the corresponding checkout station. Network hub 108 may be a local area network (LAN) hub or wireless network hub. For example, network hub 108 may be a USB Over IP hub available from Digi, Inc. of Austin, Tex. Network hub 108 and high speed communication hubs 110a-110f need to communicate at a rate of at least 12 Mbps. Preferably, hubs 110a-10f are USB 2.0 hubs that support communication in the range of 12 Mbps to 480 Mbps, such as the USB Anywhere hubs. In the preferred embodiment, server 104 includes a USB 2.0 host controller that enables data communication between server 104 and hub 108 at the rate maintained between hub 108 and high speed hubs 110a-110f. Server 104 also includes an operating system, such as Windows 2000, Windows XP, NT 4.0, and a network communication stack, such as Inside Out Networks 4.0 USB stack. Alternatively, communication components implementing the 1394 Firewire specification may be used to provide high speed data communication between the central processor and the checkout stations. The high speed data communication between server 104 and self-checkout stations 110a-110f enables the central processor of system 100 to communicate with the high speed hubs 110a-110f so negligible delay occurs in the communication between server 104 and hubs 110a-110f. Consequently, the processor of server 104 may provide the data processing and checkout station control that was previously provided by a processor resident in each of the self-checkout stations 110a-110f. Thus, each of the self-checkout stations 10a-10f no longer requires a processor and the processor support components for control of the station operations. This alteration in the architecture of the self-checkout stations reduces the cost of the stations and simplifies the maintenance and servicing of the stations.

Figure 3:
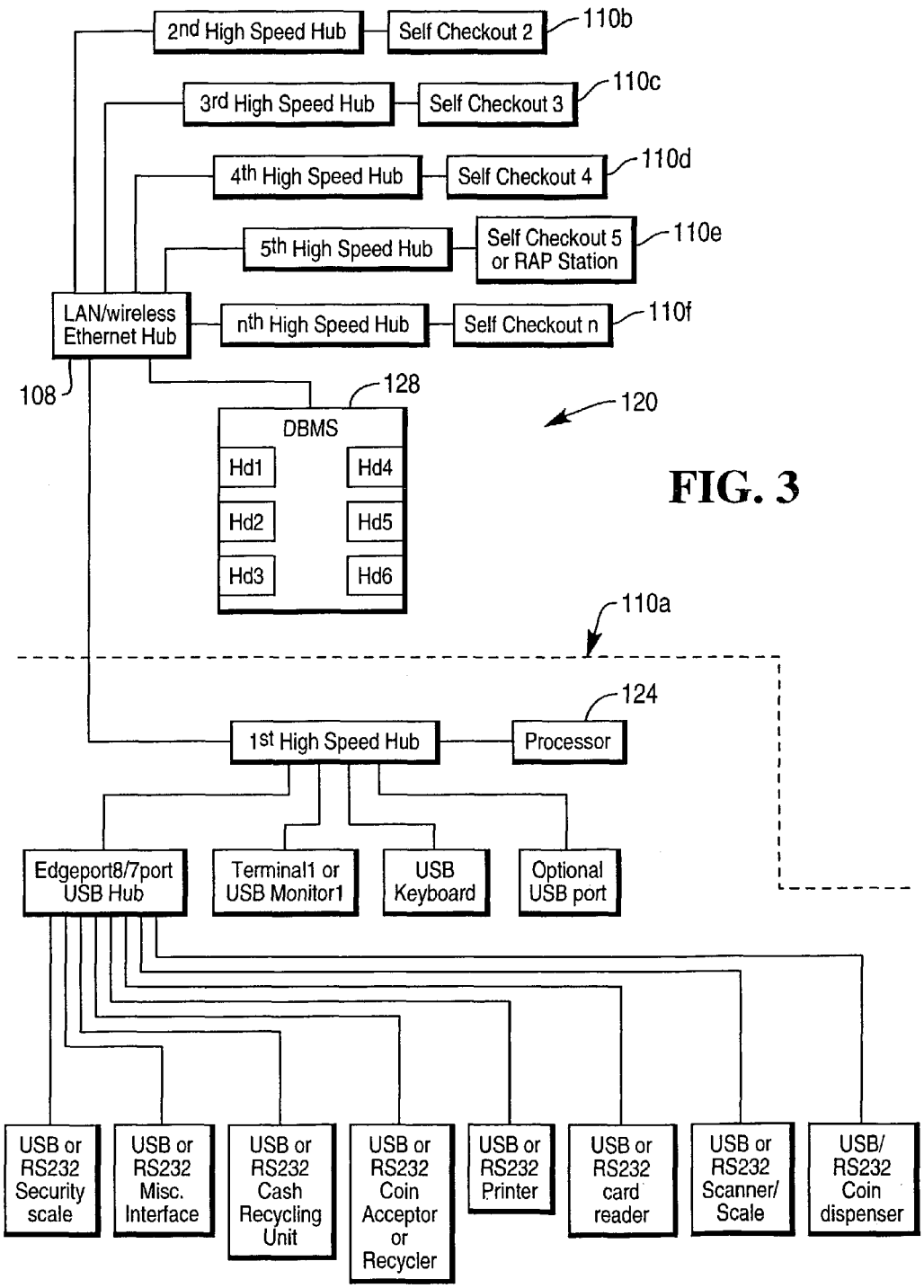
FIG. 3 is a block diagram of an alternative embodiment of the present invention.

One reason for preferring the USB 2.0 implementation of the present invention is the backward compatibility of USB 2.0 with devices that use USB 1.1 for communication. Additionally, if some of the components in a self-checkout station communicate through a USB 2.0 motherboard, communication rates within a checkout station may be sufficient to permit one of the processors in a checkout station to act as the central processor for other checkout stations coupled to it. Such a system 120 is shown in FIG. 3. Using like numerals for like components, system 120 includes self-checkout stations 110a-110f that are coupled to one another through network hub 108. Processor 124 of self-checkout station 110a may be used to control the operations of checkout stations 110a-110f, provided processor 124 conforms to the requirements for the processor of server 104 discussed above. Also, system 120 includes a database management system (DBMS) 128 that may be used to store data sent to it by processor 124 for any of the self-checkout stations being controlled by processor 124. In this embodiment, database management system 128 may be remote from the checkout area where checkout stations 110a-110f are located. System 120 does not require a server 104 although at least one of the checkout stations 110a-110f requires a processor and data storage support adequate to support server operations.

As shown in FIGS. 2 and 3, a self-checkout station may have an architecture that couples the components of the checkout station to high speed data hub 108. For example, with reference to FIG. 2 and using like numerals for like components, self-checkout station 10a includes a USB 2.0 interface 130 to which a security scale 48, cash recycling unit 134, coin acceptor 40, printer 44, magnetic card reader 32, scanner/scale 26 and coin dispenser 36 are coupled. A USB or RS-232C interface 138 may also be provided to couple additional devices to a single port of interface 130. Interface 130 may be an Edgeport8/7port USB hub, for example. The components coupled to interface 130 may communicate in accordance with the RS-232C, USB 1.1, or USB 2.0 specification. Interface 130 multiplexes the communication from the components to high speed data hub 110a. The communication between a component and hub 110a through interface 130 is performed at the rate supported by the component. For example, a coin acceptor that communicates in accordance with the RS-232C specification sends and receives messages at a rate supported by that specification while a component that communicates in accordance with the USB 1.1 specification sends and receives messages at the rate supported by that specification. Consequently, communication rates within a checkout station remain at previously supported rates. However, once messages reach high speed hub 108, they are transmitted at the higher data rate to the central processor through network hub 108 and messages for a component are provided at the higher data rate until they reach hub 110a for internal communication within a checkout station. Likewise, communication between hub 10a and one of the checkout station components coupled to hub 110a, such as monitor 34, keyboard 38 or an optional USB device 140 or a device coupled to a USB port 144, remains at the rate of the component. Of course, one way that throughput in system 100 or system 120 may be improved to provide the data communication support for 12 Mbps or higher rates between hub 110a and the checkout station components. However, communication data rates of approximately 12 Mbps or higher are adequate to support the architecture of the present invention even though checkout station internal communication remains at previously supported rates.

Figure 4:
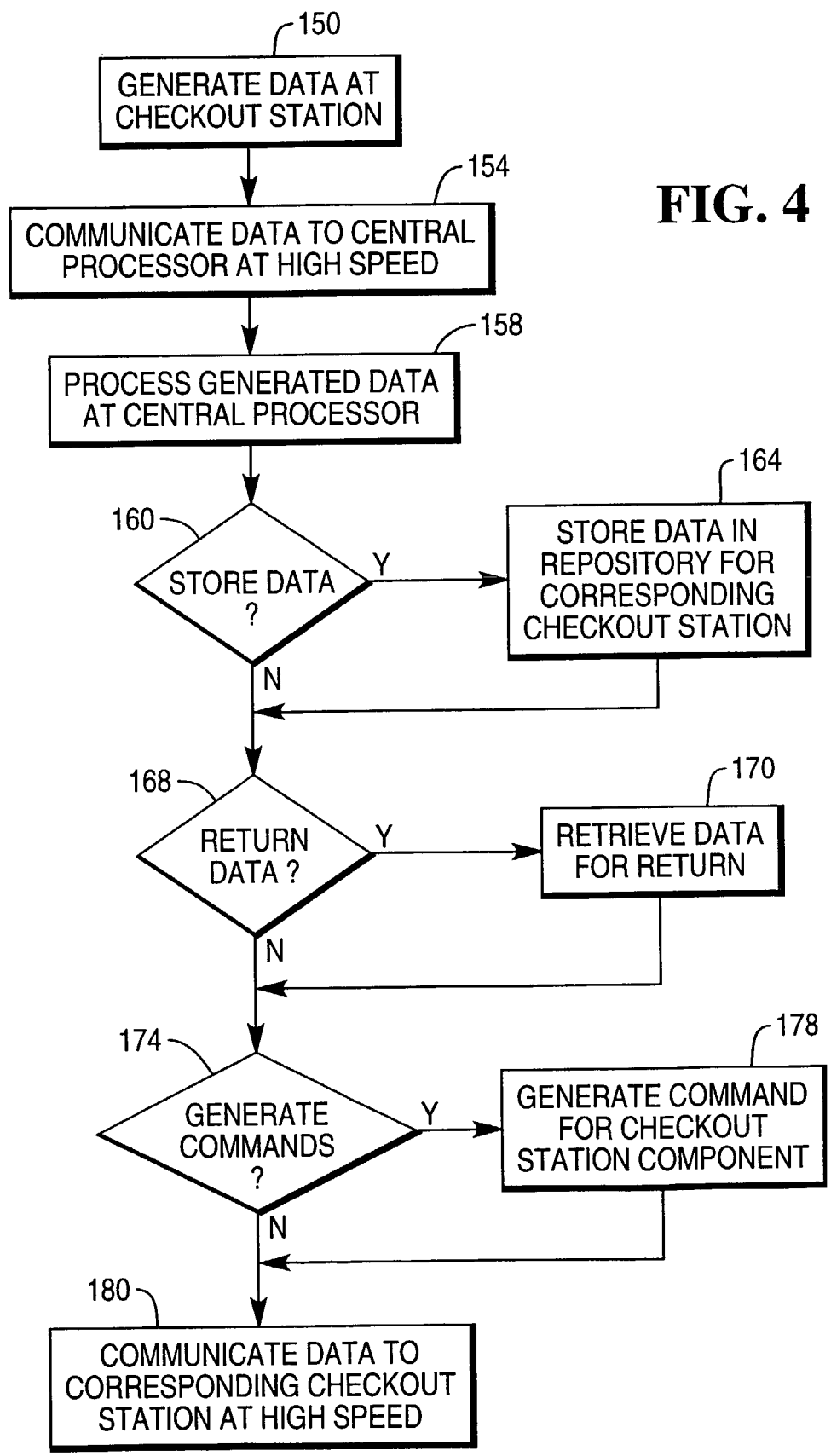
FIG. 4 is a flow diagram of a method incorporating the principles of the present invention.

A method incorporating the principles of the present invention is shown in FIG. 4. As part of the method, data is generated at a checkout station (block 150). The generated data may be a request for data or data received by one of the checkout station components, such as a scanner, keyboard, magnetic stripe reader, or other checkout station component. The generated data is communicated to a central processor at a high speed data rate (block 154). The data is processed by the central processor (block 158). A determination is made as to whether data are to be stored (block 160). If data are to be stored, the data are stored in the data repository corresponding to the checkout station from which the data were received (block 164). The data repository may be located proximate to the central processor or it may be a database remotely located from the central processor. Alternatively, the data may be formatted in a return message for storage at the corresponding checkout station. The method determines whether data are to be returned to the checkout station in response to a data request (block 168). If data are to be returned, the data are retrieved for a return message (block 170). A determination is made as to whether a component command is to be generated (block 174). If one or more commands are required, the command or commands are generated (block 178). Any data or commands to be returned are formatted into a message and communicated at a high speed data rate to the corresponding checkout station (block 180). The high speed data rate at which data are communicated between the central processor and a checkout station is at least 12 Mbps.

In operation, a plurality of self-checkout, checkout, or remote attendant stations are provided with a high speed data hub that is coupled to the components of the station. The high speed data hub of each station is coupled to a network hub. A server is also coupled to the network hub with a high speed data link. The processor of the server is used to receive messages from the stations over the high speed data network, process the messages, and send control messages and data to the stations over the high speed data network to control the stations. This control is implemented without a processor and supporting components being required at each station. Alternatively, the stations may be coupled together through high speed data hubs and the network hub provided that one of the stations has a processor and support components adequate for one of the stations to act as a server for the network of stations. The processor of this station may then act as the central processor for controlling the operations of all of the stations on the network.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. For example, the reader should appreciate that the term "checkout station" as used above applies to cashier-operated checkout stations, self-checkout stations, remote attendant stations, and food service terminals and the like. Additionally, the present invention may be used with a wireless network implementing a high speed protocol, such as the 802.11b protocol. The invention in its broadest aspects is therefore not limited to the specific details, implementations, or illustrative examples shown and described. Accordingly, departures may be made from such details without departing from the spirit or scope of applicant's general inventive concept.

What is claimed is:
1. A system for controlling the operation of a plurality of checkout stations, the system comprising:
   a central server comprising a central processor operating under the control of a checkout station control application and further comprising a network hub;

a plurality of checkout stations, each checkout station in the plurality of the checkout stations comprising a high speed data hub in communication with the network hub, each checkout station in the plurality of checkout stations further comprising a plurality of components, one or more of the components being adapted to transmit data directly to the central processor and receive data directly from the central processor using the high speed data hub associated with the checkout station and the network hub; and where the central processor directly transmits data and commands to and directly receives data from the one or more plurality of components of each checkout station in the plurality of checkout stations to control operation of each checkout station in the plurality of checkout stations, the network hub and the high speed data hub of each checkout station mediating communication between the central processor and the one or more of plurality of components of each checkout station.

2. The system of claim 1 further comprising:

data storage for each checkout station in the plurality of checkout stations.

3. The system of claim 2, the data storage further comprising:

a plurality of hard drives located remotely from the plurality of checkout stations, each hard drive in the plurality of hard drives corresponding to only one of the checkout stations in the plurality of checkout stations to provide a one to one correspondence between each drive in the plurality of hard drives and each checkout station in the plurality of checkout stations, each hard drive being used for storage of data for the checkout station corresponding to the hard drive.

4. The system of claim 2, the data storage further comprising:

a plurality of data structures located remotely from the plurality of checkout stations, each data structure in the plurality of data structures corresponding to only one of the checkout stations in the plurality of checkout stations to provide a one to one correspondence between each data structure in the plurality of data structures and each checkout station in the plurality of checkout stations, each data structure being used for storage of data for the corresponding checkout station.

5. The system of claim 4 wherein the data structure is a file.

6. The system of claim 2, the data storage further comprising:

a plurality of hard drives, each hard drive in the plurality of hard drives being located at only one of the checkout stations in the plurality of checkout stations to provide a one to one correspondence between each hard drive in the plurality of data structures and each checkout station in the plurality of checkout stations; and the central processor being configured to communicate data with each hard drive in the plurality of checkout stations through the high speed data hub coupled to the checkout station that corresponds to the hard drive with which the central processor is communicating.

7. The system of claim 1 wherein the high speed data hub is configured to communicate data at a rate of at least approximately 12 Mbps.

8. The system of claim 1, the high speed data hub conforms to the universal serial bus 2.0 standard.

9. The system of claim 1 wherein the high speed data hub conforms to the IEEE 1394 standard.

10. The system of claim 1, wherein the central processor is included in one of the checkout stations in the plurality of checkout stations so that the checkout station in which the central processor is included acts as the server for the other checkout stations.

11. The system of claim 1 further comprising: an Ethernet network that couples the network hub for the central processor to each high speed data hub for the checkout stations in the plurality of checkout stations.

12. The system of claim 1, wherein, in one or more of the checkout stations, one of the plurality of components is a scanner/scale combination and another of the plurality of components is a display terminal and wherein the central processor receives data from the scanner/scale combination and processes the data to identify items being entered into a transaction and transmits data identifying the products to the display terminal for display.

13. The system of claim 1, wherein, in one or more of the checkout stations, one of the plurality of components is a security scale and wherein the central processor receives weight information from the security scale and compares the weight information against expected weight information for products entered into a transaction.

14. The system of claim 1, wherein, in one or more of the checkout stations, the plurality of components include a payment terminal and a currency module and wherein the central processor communicates with the payment terminal and the currency module to process payment and reconcile a transaction.

15. The system of claim 14, wherein another of the plurality of components is a card reader and wherein the central processor receives payment card data from a payment card from the card reader and communicates with a financial network based on the data.

16. The system of claim 1, wherein, in one or more of the checkout stations, one of the plurality of components is a security camera and wherein the central processor receives images from the security camera and relays the images to a display at a security station.

* * * * *